US012592499B2

(12) United States Patent
Yang et al.

(10) Patent No.: US 12,592,499 B2
(45) Date of Patent: Mar. 31, 2026

(54) ANTENNA AND ANTENNA SYSTEM

(71) Applicant: Huawei Technologies Co., Ltd., Shenzhen (CN)

(72) Inventors: Ning Yang, Chengdu (CN); Meng Cai, Chengdu (CN); Chuanhui Ma, Chengdu (CN); Qing Wang, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 18 days.

(21) Appl. No.: 18/676,807

(22) Filed: May 29, 2024

(65) Prior Publication Data

US 2024/0313429 A1 Sep. 19, 2024

Related U.S. Application Data

(63) Continuation of application No. PCT/CN2021/134495, filed on Nov. 30, 2021.

(51) Int. Cl.
*H01Q 21/28* (2006.01)
*H01Q 1/52* (2006.01)
*H01Q 15/16* (2006.01)

(52) U.S. Cl.
CPC ............ *H01Q 21/28* (2013.01); *H01Q 1/521* (2013.01); *H01Q 15/16* (2013.01)

(58) Field of Classification Search
CPC ......... H01Q 21/28; H01Q 1/521; H01Q 15/16
See application file for complete search history.

(56) References Cited

U.S. PATENT DOCUMENTS 4,259,674 A * 3/1981 Dragone .............. H01Q 3/2658 343/753
6,252,559 B1 6/2001 Donn
7,161,549 B1 1/2007 Cuchanski et al.
9,774,095 B1 9/2017 Fenner
2011/0267251 A1 11/2011 Mathews et al.

FOREIGN PATENT DOCUMENTS

CN 213278388 U 5/2021
JP H04140907 A 5/1992

* cited by examiner

*Primary Examiner* — Graham P Smith
(74) *Attorney, Agent, or Firm* — Slater Matsil, LLP

(57) ABSTRACT

Embodiments of this application provide an antenna and an antenna system. As the antenna is functionally equivalent to a plurality of conventional antennas, device costs and base station space occupied by the antenna can be reduced. The antenna includes a first reflective surface and N feeds, where N is an integer greater than 1. The N feeds are disposed on the first reflective surface, the first reflective surface includes N areas, the N areas are in one-to-one correspondence with the N feeds, and each area is used to reflect a beam radiated by a corresponding feed.

18 Claims, 4 Drawing Sheets

ANTENNA AND ANTENNA SYSTEM

CROSS-REFERENCE TO RELATED APPLICATIONS

This application is a continuation of International Application No. PCT/CN2021/134495, filed on Nov. 30, 2021, the disclosure of which is hereby incorporated by reference in its entirety.

TECHNICAL FIELD

Embodiments of this application relate to the field of communication technologies, and in particular, to an antenna and an antenna system.

BACKGROUND

Nowadays, users have higher requirements on types and quality of data content, and a quantity of devices connected to a network increases exponentially. These impose increasing traffic pressure on networks.

Microwave backhaul bears data transmission between an access network and a core network, and the increase of transmission capacities is a basic guarantee for healthy growth of data traffic. As a spectrum bandwidth and a modulation order cannot continuously increase, multi-antenna technologies such as multiple input multiple output (MIMO) and full-duplex gradually become main technical options. In the multi-antenna technology, a plurality of beams are generated by using a plurality of antennas, and spectral efficiency is improved by increasing a quantity of data streams. In addition, the beams herein are independent of each other, that is, the beams are uncorrelated with each other.

However, deployment of the plurality of antennas has problems such as high device costs and limited base station space, limiting large-scale deployment of the multi-antenna technology.

SUMMARY

Embodiments of this application provide an antenna and an antenna system. The antenna, which is functionally equivalent to a plurality of conventional antennas, is used to reduce device costs and base station space occupied by the antenna.

According to a first aspect, this application provides an antenna. The antenna includes a first reflective surface and N feeds, where N is an integer greater than 1. The N feeds are disposed on the first reflective surface. The first reflective surface includes N areas, where a quantity of areas and a shape of the areas are not specifically limited in this application. The N areas are in one-to-one correspondence with the N feeds, and each of the areas is used to reflect a beam radiated by a corresponding feed. It should be noted that the area may directly reflect the beam radiated by the feed, or may indirectly radiate the beam radiated by the feed.

The antenna includes the first reflective surface and a plurality of feeds. The first reflective surface includes a plurality of areas, and each of the areas is used to reflect the beam radiated by a corresponding feed. Therefore, one antenna is functionally equivalent to a plurality of antennas, and can implement independent multi-beam radiation, so that device costs and base station space occupied by the antenna can be reduced.

In an implementation, the antenna further includes N second reflective surfaces. The N second reflective surfaces are in one-to-one correspondence with the N feeds, and each of the second reflective surfaces is used to reflect, to an area, a beam radiated by a corresponding feed. Each area is used to reflect a beam from a second reflective surface. A relative position between the first reflective surface and the second reflective surface may be fastened by using an external component such as a frame.

The second reflective surface reflects, to the area of the first reflective surface, the beam radiated by the feed, and then the beam is reflected by the area of the first reflective surface, to complete beam transmission. In this way, the antenna provided in this application can be applied to a plurality of application scenarios in which a type of the first reflective surface is a Cassegrain antenna, a Gregorian antenna, or an annular focus antenna.

In an implementation, a virtual focus of each second reflective surface coincides with a real focus of the first reflective surface.

The virtual focus of each second reflective surface coincides with the real focus of the first reflective surface, so that beams reflected by the N areas of the first reflective surface are radiated in a same direction.

In an implementation, a baffle plate is disposed between adjacent areas of the N areas, to block signal propagation between the areas.

Because the baffle plate is disposed between the adjacent areas, the beam radiated by the feed can be radiated only to the area of the first reflective surface corresponding to the feed, and cannot be radiated to another area of the first reflective surface, so that isolation between the beams is increased and interference between beams in the adjacent areas is avoided.

In an implementation, an isolation area is disposed between the adjacent areas of the N areas.

Because the isolation area is disposed between the adjacent areas, the beam radiated by the feed can be radiated only to the area of the first reflective surface corresponding to the feed, and cannot be radiated to another area of the first reflective surface, so that the isolation between the beams is increased and the interference between the beams in the adjacent areas is avoided.

In an implementation, a type of the feed is one of the following: a horn antenna, a microstrip antenna, and a dielectric loaded antenna.

In an implementation, when the type of the feed is the horn antenna, the feed is a pyramidal horn.

When the feed is the pyramidal horn, in a case in which the feed and the second reflective surface are controlled to rotate by a specific angle, electric field distribution and a modulus ratio of the pyramidal horn may be controlled, so that the beam radiated by the feed covers the area of the first reflective surface corresponding to the feed as much as possible.

In an implementation, the type of the first reflective surface may be a feedforward parabolic antenna.

In an implementation, the type of the first reflective surface is one of the following: the Cassegrain antenna, the Gregorian antenna, and the annular focus antenna.

According to a second aspect, this application provides an antenna system, including the antenna according to any one of the implementations of the first aspect.

DETAILED DESCRIPTION OF ILLUSTRATIVE EMBODIMENTS

The following describes technical solutions in embodiments of this application in detail with reference to the accompanying drawings in embodiments of this application.

Because deployment of a plurality of antennas has problems such as high device costs and limited base station space, embodiments of this application provide an antenna. The antenna includes a plurality of small antenna systems, and each of the small antenna systems may independently radiate a beam. Therefore, one antenna provided in embodiments of this application can implement multi-beam radiation. In other words, one antenna provided in embodiments of this application is functionally equivalent to a plurality of conventional antennas. Therefore, the device costs and the base station space occupied by the antenna can be reduced.

The following describes the antenna provided in embodiments of this application.

Figure 1:
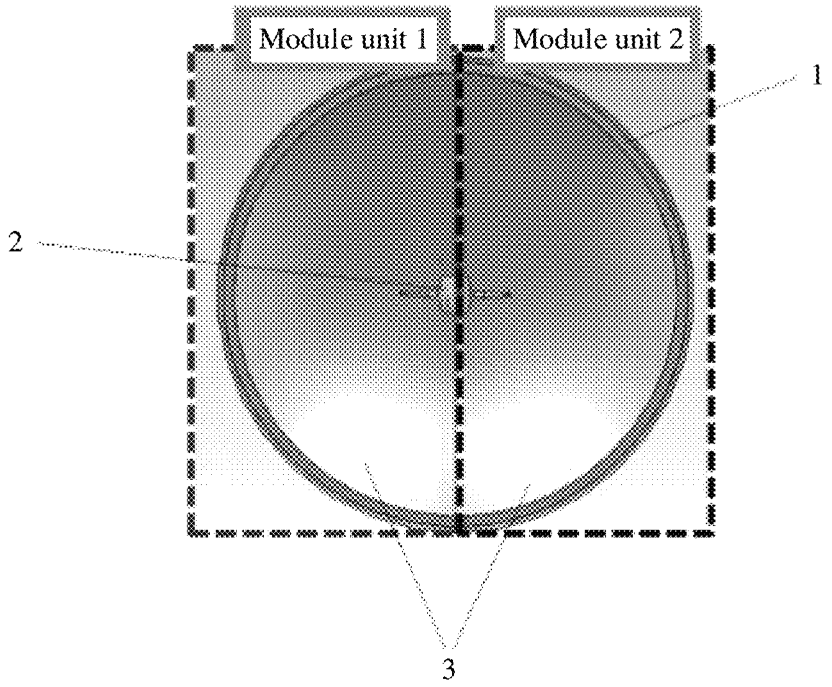
FIG. 1 is a diagram of a structure of a first embodiment of an antenna according to an embodiment of this application.

Refer to FIG. 1. An embodiment of this application provides an antenna. The antenna includes a first reflective surface 1 and N feeds 2, where N is an integer greater than 1.

The N feeds 2 are disposed on the first reflective surface 1. A manner of disposing the feed 2 is not specifically limited in this embodiment of this application.

The first reflective surface 1 includes N areas 3. A quantity of areas 3 and a shape of the areas 3 are not specifically limited in this embodiment of this application.

FIG. 1 is used as an example. In this embodiment of this application, the first reflective surface 1 is divided into two areas 3, and each of the areas 3 is in a shape of a semicircle.

The N areas 3 have a one-to-one correspondence with the N feeds 2, and each of the areas 3 is used to reflect a beam radiated by a corresponding feed 2.

It should be noted that the area 3 may directly reflect the beam radiated by the feed 2, or may indirectly radiate the beam radiated by the feed 2.

Specifically, when a type of the first reflective surface 1 is a feedforward parabolic antenna, the beam radiated by the feed 2 is directly radiated to the area 3 of the first reflective surface 1, and then the area 3 of the first reflective surface 1 directly reflects the beam.

In this case, one area 3 of the first reflective surface 1 and one feed 2 may form a small antenna system, and the small antenna system can independently radiate the beam.

The antenna shown in FIG. 1 is used as an example. The antenna includes two feeds 2, and the first reflective surface 1 includes two areas 3. Therefore, the antenna may be mapped into two small antenna systems, to implement radiation of two independent beams. In FIG. 1, the two small antenna systems are represented as a module unit 1 and a module unit 2.

In another implementation, a type of the first reflective surface 1 is one of the following: a Cassegrain antenna, a Gregorian antenna, and/or an annular focus antenna. In this case, the beam radiated by the feed 2 is reflected to the area 3 of the first reflective surface 1, instead of being directly radiated to the area 3 of the first reflective surface 1.

Figure 2:
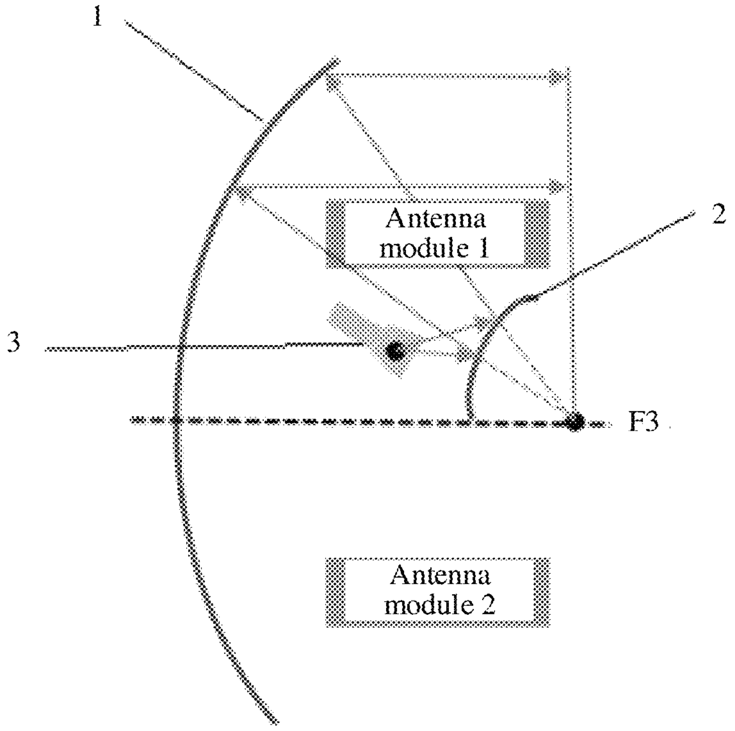
FIG. 2 is a diagram of a structure of a second embodiment of an antenna according to an embodiment of this application.

Specifically, as shown in FIG. 2, the antenna further includes N second reflective surfaces 6.

The N second reflective surfaces 6 are in one-to-one correspondence with the N feeds 2, and each of the second reflective surfaces 6 is used to reflect, to an area 3, a beam radiated by a corresponding feed 2.

It should be noted that the first reflective surface 1 and the second reflective surface 6 may not be directly connected, and specifically, the first reflective surface 1 and the second reflective surface 6 may be fastened by using a frame, to implement a relative position shown in FIG. 2.

Each area 3 is used to reflect a beam from a second reflective surface 6.

In this case, one second reflective surface 6, one area 3 of the first reflective surface 1, and one feed 2 may form a small antenna system, and the small antenna system can independently radiate the beam.

Specifically, FIG. 2 shows two small antenna units, and the two small antenna units include an antenna module 1 and an antenna module 2.

The antenna module 1 is used as an example. The antenna module 1 includes the first reflective surface 1, the second reflective surface 6 (a secondary reflective surface), and the feed 2. It can be seen from FIG. 2 that the beam radiated by the feed 2 is first radiated to the secondary reflective surface, and then the secondary reflective surface radiates the beam to an area 3 of the reflective surface.

In this embodiment of this application, the antenna includes the first reflective surface 1 and the plurality of feeds 2. The first reflective surface 1 includes a plurality of areas 3, and each of the areas 3 is used to reflect a beam radiated by a corresponding feed 2. Therefore, one antenna is functionally equivalent to a plurality of antennas, and can implement independent multi-beam radiation, so that device costs and base station space occupied by the antenna can be reduced.

It may be understood that a radiation direction of the beam can be controlled by controlling the relative position between the first reflective surface 1 and the second reflective surface 6.

In this way, directions of beams output from the first reflective surface 1 are consistent, and a virtual focus of each second reflective surface 6 coincides with a real focus of the first reflective surface 1.

As shown in FIG. 2, the virtual focus of the second reflective surface 6 and the real focus of the first reflective surface 1 are both F3. Therefore, all the beams reflected by the first reflective surface 1 are radiated in a horizontal direction.

A type of the feed 2 is not specifically limited in this embodiment of this application. For example, the type of the feed 2 is one of the following: a horn antenna, a microstrip antenna, and a dielectric loaded antenna.

When the type of the feed 2 is the horn antenna, the feed 2 may be a pyramidal horn. Specifically, the feed 2 may be a pyramidal horn fed by a square waveguide.

When the feed 2 is the pyramidal horn, in a case in which the feed 2 and the second reflective surface 6 are controlled to rotate by a specific angle, electric field distribution and a modulus ratio of the pyramidal horn may be controlled, so that the beam radiated by the feed 2 covers the area 3 of the first reflective surface 1 corresponding to the feed 2 as much as possible.

Figure 3:
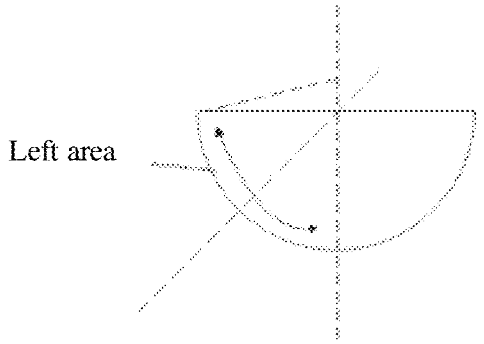
FIG. 3 is a diagram of a coverage area of a beam according to an embodiment of this application.

For example, as shown in FIG. 3, the first reflective surface 1 includes two areas 3. The electric field distribution and the modulus ratio of the pyramidal horn are controlled, so that the beam radiated by the feed 2 can completely cover an area 3 on the left side of the first reflective surface 1. In FIG. 3, a bidirectional arrow is used for representing an angle occupied by the area 3 on the left side of the first reflective surface 1.

Figure 4:
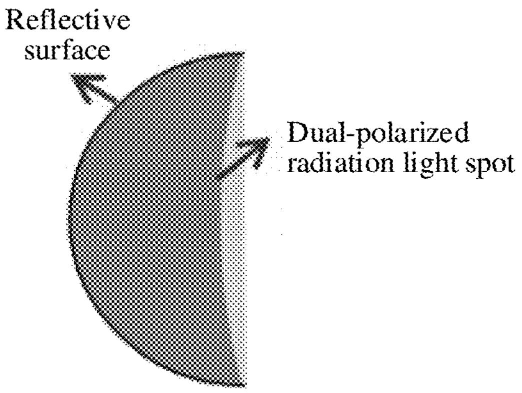
FIG. 4 is a diagram of beam dual polarization according to an embodiment of this application.

When the feed 2 may be the pyramidal horn fed by the square waveguide, in a case in which the feed 2 and the second reflective surface 6 are controlled to rotate by the specific angle, the electric field distribution and the modulus ratio of the pyramidal horn are controlled, so that shapes of dual-polarized radiation light spots can be further unified. A shape of the dual-polarized radiation light spot is shown in FIG. 4.

It may be understood that a part of the beam radiated by the feed 2 may be radiated to the area 3 of the first reflective surface 1 corresponding to the feed 2, and the other part may be radiated to another area 3 of the first reflective surface 1.

Therefore, to prevent the beam from being radiated to an area 3 of a first reflective surface 1 that does not correspond to the feed, in an implementation, a baffle plate 4 is disposed between adjacent areas 3 of the N areas 3, and the baffle plate 4 is used to block signal propagation between the areas 3.

The baffle plate 4 may also be referred to as a non-wave-transparent baffle plate.

Figure 5:
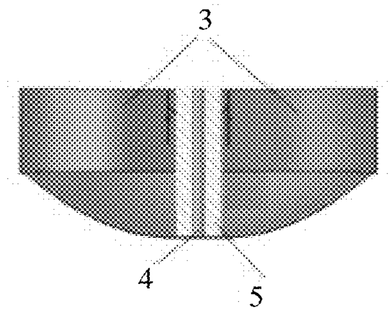
FIG. 5 is a diagram of a baffle plate and an isolation area according to an embodiment of this application.

For example, as shown in FIG. 5, two areas 3 are disposed on the first reflective surface 1, and the baffle plate 4 is disposed between the two areas 3.

Because the baffle plate 4 is disposed between the adjacent areas 3, the beam radiated by the feed 2 can be radiated only to the area 3 of the first reflective surface 1 corresponding to the feed 2, and cannot be radiated to another area 3 of the first reflective surface 1, so that isolation between beams is increased and interference between the beams in the adjacent area 3 is avoided.

When the antenna includes the second reflective surface 6, a size of the baffle plate 4 may be appropriately increased, so that the baffle plate 4 may not only isolate different areas 3 of the first reflective surface 1, but also isolate different feeds 2 and isolate different second reflective surfaces 6, that is, isolate different antenna systems of the antenna completely. In this way, the isolation between the beams is increased.

In addition to the foregoing method, in an implementation, an isolation area 5 is disposed between the adjacent areas 3 of the N areas 3.

For example, as shown in FIG. 5, the two areas 3 are disposed on the first reflective surface 1, and the isolation area 5 is disposed between the two areas 3.

In this embodiment, the isolation area 5 is disposed between the adjacent areas 3. This may further increase the isolation between the adjacent areas 3.

In another possible implementation, the foregoing two isolation solutions may alternatively be combined. To be specific, both the isolation area 5 and the baffle plate 4 are disposed, where the baffle plate 4 may be disposed in the isolation area 5.

The following describes two scenarios to which the antenna in embodiments of this application is applied.

1. Multiple Input Multiple Output (MIMO) Scenario

Figure 6:
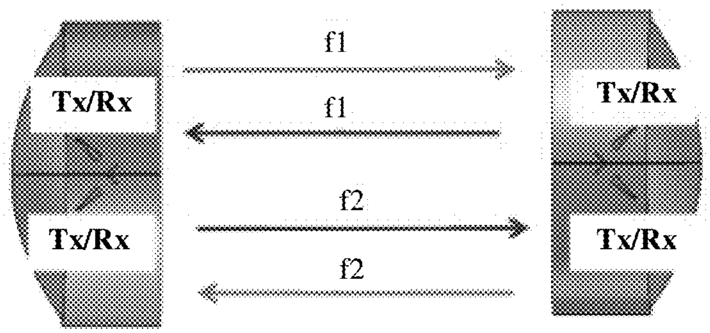
FIG. 6 is a diagram of a first scenario to which an antenna is applied according to an embodiment of this application.

Refer to FIG. 6. Two antennas provided in this embodiment of this application are used as a transmit antenna and a receive antenna. It can be learned from FIG. 6 that the antenna provided in this embodiment of this application includes two small antenna systems, and each small antenna system can transmit and receive beams of a same frequency. Therefore, one antenna provided in this embodiment of this application is functionally equivalent to two conventional antennas, and a quantity of antennas and space occupied by the antenna are reduced when two beams can be received and transmitted.

f1 and f2 represent different frequencies, TX represents a transmit end, and RX represents a receive end.

2. Full-Duplex Scenario

Figure 7:
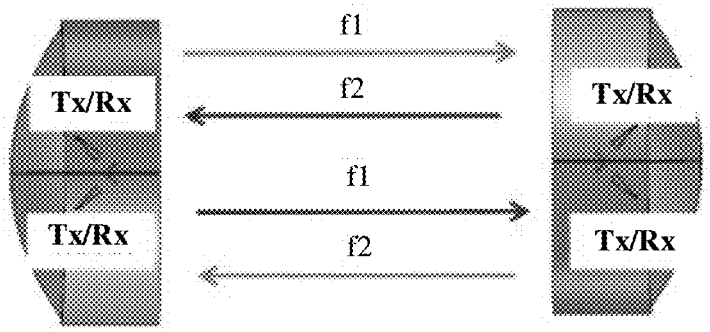
FIG. 7 is a diagram of a second scenario to which an antenna is applied according to an embodiment of this application.

Refer to FIG. 7. Two antennas provided in this embodiment of this application are used as a transmit antenna and a receive antenna. It can be learned from FIG. 7 that the antenna provided in this embodiment of this application includes two small antenna systems, and each small antenna system can transmit and receive beams of different frequencies. Therefore, one antenna provided in this embodiment of this application is functionally equivalent to two conventional antennas, and a quantity of antennas and space occupied by the antenna are reduced when two beams can be received and transmitted.

f1 and f2 represent different frequencies, TX represents a transmit end, and RX represents a receive end.

In addition, this application further provides an embodiment of an antenna system. The embodiment includes a plurality of antennas as mentioned in FIG. 1 to FIG. 7.

What is claimed is:

1. An antenna, comprising:
a first reflective surface;
N feeds disposed on the first reflective surface; and
N second reflective surfaces,
wherein N is an integer greater than 1,
wherein the first reflective surface comprises N areas,
wherein the N areas are in one-to-one correspondence with the N feeds,
wherein the N second reflective surfaces are in one-to-one correspondence with the N feeds, and each of the N second reflective surfaces is configured to reflect, to one of the N areas, a beam radiated by a corresponding one of the N feeds,
wherein each of the N areas is configured to reflect a beam from a corresponding one of the N second reflective surfaces, and
wherein a virtual focus of each of the N second reflective surfaces coincides with a real focus of the first reflective surface.

2. The antenna according to claim 1, wherein a baffle plate is disposed between adjacent areas of the N areas, to block signal propagation between the adjacent areas.

3. The antenna according to claim 1, wherein an isolation area is disposed between adjacent areas of the N areas.

4. The antenna according to claim 1, wherein a type of each of the N feeds is one of: a horn antenna, a microstrip antenna, or a dielectric loaded antenna.

5. The antenna according to claim 4, wherein when the type of a respective feed of the N feeds is the horn antenna, the respective feed is a pyramidal horn.

6. The antenna according to claim 1, wherein a type of the first reflective surface is a feedforward parabolic antenna.

7. The antenna according to claim 1, wherein a type of the first reflective surface is one of: a Cassegrain antenna, a Gregorian antenna, or an annular focus antenna.

8. An antenna system, comprising:

a plurality of antennas, wherein a first antenna of the plurality of antennas comprises a first reflective surface, N second reflective surfaces, and N feeds, and N is an integer greater than 1, wherein the N feeds are disposed on the first reflective surface, wherein the first reflective surface comprises N areas, wherein the N areas are in one-to-one correspondence with the N feeds, wherein the N second reflective surfaces are in one-to-one correspondence with the N feeds, and each of the N second reflective surfaces is configured to reflect, to one of the N areas, a beam radiated by a corresponding one of the N feeds, wherein each of the N areas is configured to reflect a beam from a corresponding one of the N second reflective surfaces, and wherein a virtual focus of each of the N second reflective surfaces coincides with a real focus of the first reflective surface.

9. The antenna system according to claim 8, wherein a baffle plate is disposed between adjacent areas of the N areas, to block signal propagation between the adjacent areas.

10. The antenna system according to claim 8, wherein an isolation area is disposed between adjacent areas of the N areas.

11. The antenna system according to claim 8, wherein a type of each of the N feeds is one of: a horn antenna, a microstrip antenna, or a dielectric loaded antenna.

12. The antenna system according to claim 11, wherein when the type of a respective feed of the N feeds is the horn antenna, the respective feed is a pyramidal horn.

13. The antenna system according to claim 8, wherein a type of the first reflective surface is a feedforward parabolic antenna.

14. The antenna system according to claim 8, wherein a type of the first reflective surface is one of: a Cassegrain antenna, a Gregorian antenna, or an annular focus antenna.

15. The antenna according to claim 1, wherein the first reflective surface is a concave surface, and wherein each of the N second reflective surfaces is a convex surface.

16. The antenna according to claim 1, wherein the virtual focus of each of the N second reflective surfaces is disposed on an opposing side of the N second reflective surfaces as the real focus of the first reflective surface.

17. The antenna system according to claim 8, wherein the first reflective surface is a concave surface, and wherein each of the N second reflective surfaces is a convex surface.

18. The antenna system according to claim 8, wherein the virtual focus of each of the N second reflective surfaces is disposed on an opposing side of the N second reflective surfaces as the real focus of the first reflective surface.

* * * * *